Patented June 23, 1936

2,044,962

UNITED STATES PATENT OFFICE 2,044,962

METHOD OF MAKING RUBBER BONDED ABRASIVE ARTICLES

Duane E. Webster, Worcester, Mass., assignor to Norton Company, Worcester, Mass., a corporation of Massachusetts No Drawing. Application January 2, 1931, Serial No. 506,311

15 Claims. (Cl. 51—278)

This invention relates to abrasive articles and particularly to articles, such as grinding wheels, made of abrasive grains bonded by means of rubber.

It is one object of this invention to make a rubber bonded abrasive article, such as a grinding wheel, which has a more porous structure than obtainable by the methods heretofore practiced and one which is highly serviceable for various types of grinding operations.

A further object of the invention is to provide a rubber bonded abrasive article and a method of making the same, which has a controlled structure as regards the volume percentages of the abrasive material, the rubber bond and the pore spaces therebetween, and particularly so that an abrasive article may be made in accordance with predetermined specifications and may be readily duplicated at any time.

With these and other objects in view as will be apparent to one skilled in the art, this invention resides in the combination of the steps of a process and of the composition of matter as set forth in the following specification and the claims appended hereto.

In accordance with this invention I have found it feasible to make a porous abrasive article having a rubber bond, and one which has a controlled structure, by mixing the abrasive grains and the rubber, together with other necessary ingredients, in such a manner as to form a subdivided mass of rubber containing the abrasive grains distributed therein, which is light and fluffy or generally loose or porous in its structure and which is capable of being parceled out in weighed portions for the purposes of molding a definite amount to a desired shape. Owing to its light and fluffy nature it may be molded and compressed to various degrees of density or porosity or until it assumes a desired weight per unit of volume.

One manner of carrying out my invention involves first mixing rubber with sulfur, which serves as the vulcanizing agent, in proper proportions to serve as the grinding wheel bond and then subdividing or shredding the rubber and incorporating the abrasive grains therein, and preferably with the aid of a rubber plasticizing or softening medium. Thereafter the rubber abrasive particles may be molded and pressed to the desired volume structure and then vulcanized to set the bond.

In the first step of my preferred method the raw rubber and sulfur are repeatedly folded and passed between revolving rolls until the compound is rolled into a thin plastic sheet having a doughy consistency in which the sulfur is uniformly incorporated throughout the mass. During the rolling operation, the sulfur is added in the form of a powder which is sprinkled on the surface of the rubber sheet prior to each successive passage through the rolls; the sheet being folded to retain the sulfur between the folds preliminary to its passage through the rolls and to intimately and uniformly mix it in the mass. Any suitable proportion of rubber and sulfur may be utilized, such as 65 parts by weight of crude rubber and 35 parts of sulfur.

A definite weighed amount of granular abrasive material of any suitable size is then placed in a mechanical kneading machine to which is added a predetermined amount of a suitable rubber vulcanization accelerator and solvent or plasticizing agent, such as coal tar naphtha having a boiling point of 160° C. The abrasive material is now warmed in the kneading machine by means of a suitable heating agency, such as a steam heated jacket, and a weighed amount of the sheeted rubber compound is then added. This machine has revolving blades which serve to knead the mass so as to allow the abrasive material to shred or tear the rubber compound. Suitable amounts of the plasticizing agent or solvent may be employed in the mix, but a mix employing about 40 cc. of naphtha per pound of compound is to be preferred. It is essential that the rubber solvent be present in an insufficient quantity to form a true liquid solution but in an amount sufficient to cause the rubber in the softened state to adhere to the abrasive grains. During the kneading operation the plasticizer or softener serves to dissolve the rubber and reduce it to a spongy semi-plastic condition while the abrasive grains and the kneading blades act on the mass to tear and shred the rubber into a light fluffy material. While in this condition, the compound and abrasive are stirred thoroughly and intermixed by the kneading elements to uniformly incorporate the abrasive throughout the mass, the naphtha being evaporated gradually by the heat employed, so that ultimately the mass becomes less sticky and more mealy in its nature, thereby enabling it to be handled easily and parceled out in small or large batches as is required for weighing definite amounts of the material. The mixed product then comprises a porous, fluffy, friable mass which is made up of small masses, each consisting of an abrasive grain or a cluster of grains embedded or encased in a fluffy spongy mass of uncured rubber. During this kneading operation, the kneading machine is heated to a predetermined temperature in order to maintain the rubber compound in a workable condition.

In order to have a controlled wheel structure, the mixture when molded should have a definite weight per unit volume in the finished product. To this end, the abrasive and the rubber bond are initially mixed in calculated weight proportions so that each will form a predetermined percentage of the total volume of the bonded article. After they have been mixed, a precalculated weighed amount of the mixture is compressed in a mold of given size to a definite predetermined volume. It is to be understood, of course, that the amount of abrasive which may be incorporated in each pound of rubber bond is restricted within certain well defined physical limits. If too much abrasive is added there will not be sufficient bond present to cement or hold the grains together; if too little, then difficulty will be encountered in working and maturing the bond. In the manufacture of rubber wheels, it has been found that for a definite grit size, the maximum amount of abrasive grains which may be united with the bond is in a weight proportion of 16 to 1, and the minimum amount which may be utilized satisfactorily for grinding wheels is in the ratio of 5 to 1.

It is desirable to make various types of grinding wheels of many grain sizes and grades of hardness, as heretofore practiced. It is also desirable to provide a choice of several kinds of structure, and therefore to vary the porosity and the relative volume percentages of abrasive, bond and pores. For example, to better illustrate this structural relationship, the following table shows grinding wheels made with different abrasive and bond ratios and the volume relationship of the brasive, bond and pores corresponding to the weight ratio selected.

| Weight ratio abrasive bond | Vol. % abrasive | Vol. % bond | Vol. % pores | Weight per unit of vol. | Wheel grade |
|---|---|---|---|---|---|
| 16/1 | 54 | 11 | 35 | 2.26 | H |
| 6/1 | 54 | 29 | 17 | 2.48 | T |
| 6/1 | 58 | 30 | 12 | 2.67 | T |

For example, the wheel described in each line of the above table indicates a wheel of the same size made by bonding abrasive grains of 24 grit size with a rubber bond. As indicated in line 1, a soft wheel of grade "H" made with a ratio of 16 parts by weight of abrasive to 1 part by weight of bond has such a structure that 54% of its volume is made up of abrasive, 11% of bond, and 35% of pores and the total weight per unit of volume is 2.26 grams per cubic centimeter. In order to obtain a harder wheel which will be of grade "T", then as shown in line 2 of the table, the abrasive volume may remain the same and the weight ratio of abrasive to bond may be decreased to 6 to 1 whereby the bond content will be 29% by volume, with 17% of pores, making the total weight per unit of volume 2.48 grams per cc. If it is desired to make a wheel structure having a denser packing of abrasive grains, then we have the condition indicated in line 3 of the above table, in which the wheel grade will be the same as that shown in line 2, but the volume percentages will be 58% abrasive, 30% bond and 12% of pores, with a weight per unit volume of 2.67.

Thus, it will be seen that with the same abrasive to bond ratio, i. e. 6 to 1, and the wheel grade the same, it is possible to pack in more abrasive grains in the wheel as indicated in line 3 than were contained in the wheel shown in line 2 of the above table. Consequently, the structural relationship of the three essential portions of the wheel, the abrasive, the bond and the pores, may now be controlled, and several series of wheels may be made, in each of which the abrasive packing may remain the same but the grades of hardness may be made successively greater by using greater amounts of bond. For example, one series of wheels of varying grades may be made, all of which have 54% by volume of abrasive, and another series may be made to have 52% of abrasive.

A grinding wheel or other similar article, which will have a controlled structure, may therefore be made by weighing a precalculated amount of the correctly proportioned rubber and abrasive mixture and then compressing the mixture in a mold of desired size and shape until the rubber-abrasive mixture assumes a definite volume which has been calculated to give the desired weight per unit of volume of the mixture. If the grinding wheel is to be of a standard shape, the mold, which should be made accurately, is preferably shaped as a cylindrical ring, and a core of suitable diameter for making the hole of the wheel is inserted in the mold. A cover plate is arranged to slide within the mold walls, and gage blocks are provided of such thickness that the press platen and mold cover plate may be moved inwardly to compress the abrasive mixture to a predetermined position. In pressing this mixture to the desired weight per unit of volume, no notice is taken of the degree of pressure required, but that pressure is applied which will move the press platen to the position determined by the gage blocks. After the article has been pressed to the desired shape, it will be vulcanized either in the mold or outside of it in accordance with standard practice.

It will be understood that both the proportions of abrasive and rubber in the initial mixture and the weight of the abrasive-rubber mixture placed in the mold will be determined in accordance with curves and data which have been previously prepared for the different sizes and shapes of the various types of wheels to be made. It, however, is to be particularly noted that for a series of grinding wheels in which the volume percentage of abrasive remains constant, a curve representing the ratio of volume percentage of bond to the grade of the wheel will be a straight line. Hence from a set of curves thus prepared, each of which represents a different volume percentage of abrasive, it is now possible to make several series of wheels, in each of which the same volume percentage of abrasive is found but which are made to differ uniformly in their grades of hardness by the simple expedient of varying the amount of bond.

Having thus described my invention, what I claim as new and desire to secure by Letters Patent is:

1. The method of making a rubber bonded abrasive article comprising the steps of mixing crude coagulated rubber with a vulcanizing agent to form a rubber dough, mechanically sub-dividing the rubber dough in the presence of abrasive and a rubber plasticizing medium and forming loose masses of light, fluffy, mealy, coherable rubber particles each having the abrasive grains and vulcanizing agent embedded therein, pressing the loose rubber mixture in a mold to a desired shape, and thereafter vulcanizing the rubber and forming an integrally bonded abrasive article.

2. The method of making a rubber bonded abrasive article comprising the steps of mixing crude coagulated rubber with a vulcanizing agent, mixing the resultant rubber mass with the abrasive grains, while heating the same, and causing the abrasive material to shred the rubber into a mass of adhesive, light, fluffy, mealy rubber particles containing the abrasive grains embedded therein, shaping the mass and pressing it to a desired volume, and thereafter vulcanizing the rubber to form an integrally bonded article.

3. The method of making a rubber bonded abrasive article comprising the steps of mixing crude coagulated rubber with a vulcanizing agent to form a rubber dough, sub-dividing the rubber dough in the presence of abrasive grains and a rubber solvent and plasticizing medium and forming small loose masses of light fluffy rubber, each having the abrasive grains and sulfur substantially uniformly distributed therethrough, placing definite amounts of the loose mixture in a mold, compressing the mass to a desired shape and volume and thereafter vulcanizing the rubber.

4. The method of making a rubber bonded grinding wheel comprising the steps of compounding crude coagulated rubber with sulfur in suitable proportions to form a vulcanized grinding wheel bond, mechanically shredding the sulfur-rubber compound, while maintaining it in a heated, softened condition, and in the presence of abrasive grains and a suitable solvent which is employed in an amount insufficient to form a true liquid solution but sufficient to cause the rubber to soften and adhere to the abrasive grains, thereby forming a loose mixture of a substantially mealy consistency made up of small, fluffy, spongy, friable rubber masses having abrasive material embedded therein, and thereafter shaping an article from the mixture and vulcanizing the rubber bond.

5. The method of making a rubber bonded grinding wheel comprising the steps of mixing raw coagulated rubber with sulfur in suitable proportions to form a rubber dough which when matured will make a desired grinding wheel bond, mechanically shredding definite amounts of the sulfur-rubber compound, while maintaining it in a heated, softened condition, and in the presence of a predetermined amount of abrasive grains and a suitable rubber solvent which is employed in an amount insufficient to form a true liquid solution but sufficient to cause the rubber to soften and adhere to the abrasive grains, thereby forming a loose mixture of a substantially mealy consistency made up of small, fluffy, spongy rubber masses having abrasive material embedded therein, placing a precalculated amount of the loose mixture in a mold of predetermined size and shape, then compressing the mixture to a definite volume which has been calculated to give the desired weight per unit of volume of the mixture, and finally vulcanizing the molded article.

6. The method of making a rubber bonded abrasive article comprising the steps of compounding raw coagulated rubber with a vulcanizing agent while rolling the compound into sheet form to form a rubber dough, then shredding the sheet and mixing therewith a predetermined amount of abrasive material and a rubber solvent which is employed in an amount insufficient to form a true liquid solution but sufficient to cause the rubber to soften and adhere to the abrasive grains to form separate masses of light, fluffy rubber, each having abrasive material incorporated therein, placing a precalculated amount of the shredded mixture in a mold, and pressing the mixture to a predetermined volume which has been calculated to give an article of a desired density having an open, porous structure in which the abrasive material and bond constitute predetermined volume percentages of the article, and finally vulcanizing the bond.

7. The method of making a rubber bonded abrasive article comprising the steps of mixing coagulated raw rubber with a vulcanizing agent to form a rubber dough, mixing said rubber dough with the desired quantity of abrasive grain in the presence of a solvent employed in an amount insufficient to form a true liquid solution but sufficient to cause the rubber to soften and adhere to the abrasive grains, and thereafter molding the mixture of abrasive grains and uncured rubber and vulcanizing the mixture to form the finished article.

8. The method of making a rubber bonded abrasive article comprising the steps of mixing coagulated raw rubber with a vulcanizing agent to form a rubber dough, adding to said rubber dough the desired quantity of abrasive grains and a solvent in an insufficient quantity to form a true liquid solution but sufficient to cause the rubber in the softened state to adhere to the abrasive grains, kneading the rubber and abrasive mixture and forming a porous, fluffy, friable mass of abrasive and uncured rubber, and thereafter molding the mass and vulcanizing the rubber to form a rubber bonded abrasive article.

9. The method of making a rubber bonded abrasive article comprising the steps of mixing coagulated raw rubber with a vulcanizing agent to form a rubber dough, adding to said rubber dough a quantity of abrasive grains and a solvent in an insufficient amount to form a true liquid solution but sufficient to cause the rubber in the softened state to adhere to the abrasive grains, said grains and rubber being in proportions calculated to occupy predetermined volume percentages of the finished article, kneading the rubber and abrasive mixture and forming a porous, fluffy, friable mass of abrasive and uncured rubber, placing a predetermined amount of the mixture of abrasive grains and uncured rubber in a mold, compacting this mixture to a predetermined weight per unit of volume, and thereafter vulcanizing the rubber to form the finished article.

10. The method of making a rubber bonded abrasive article comprising the steps of preliminarily providing a mass of crude coagulated rubber dough, incorporating therein a vulcanizing agent proportioned to form hard rubber, thereafter subdividing the dough to form a porous, friable, fluffy, spongy mass and intimately mixing abrasive grains therein in the required proportions, placing a definite quantity of the rubber and abrasive particles in a mold, pressing the same to a desired volume and shape, and then converting the rubber to form an integral body of abrasive grains bonded by hard vulcanized rubber.

11. The method of making a rubber bonded abrasive article comprising the steps of initially forming a doughy mass of crude coagulated rubber and incorporating therein a vulcanizing agent proportioned to form hard rubber, thereafter subdividing the dough to form a loose, porous, spongy, friable mass and intimately mixing abrasive grains therein in precalculated amounts so that the grains and rubber each will occupy a predetermined percentage of the final vulcanized product, placing a precalculated amount of the mixture in a mold of predetermined size and shape, then compressing the mixture to a definite volume precalculated to give the desired weight per unit of volume of the raw mixture, and finally converting the rubber to form an integral body of abrasive grains bonded by hard vulcanized rubber.

12. The method of making a rubber bonded abrasive article comprising the steps of mixing crude coagulated rubber with a vulcanizing agent, mixing the resultant rubber mass with the abrasive grains at a temperature sufficient to maintain the rubber mass in a workable condition, causing the abrasive material to shred the rubber into a mass of adhesive, light, fluffy, mealy rubber particles containing the abrasive grains embedded therein, shaping the mass and pressing it to a desired volume, and thereafter vulcanizing the rubber to form an integrally bonded article.

13. The method of making a rubber bonded abrasive article comprising the steps of incorporating a sufficient amount of a vulcanizing agent into a crude rubber mass to form a rubber dough capable of vulcanizing to hard rubber, thereafter shredding the rubber dough in the presence of abrasive grains and plasticizing the same so as to cause the rubber to soften sufficiently to embed the abrasive grains, and thereafter forming an article from the rubber mass and vulcanizing the rubber to convert it into hard rubber.

14. The method of making a rubber bonded abrasive article comprising the steps of preliminarily forming a dough of crude coagulated rubber, mixing the dough with a vulcanizing agent proportioned to form hard rubber thereof, thereafter subdividing the dough and intimately mixing it with abrasive grains in required proportions, compressing a definite amount of the mixture in a mold to a required density, and then vulcanizing the rubber to a hard rubber condition and thus integrally bonding the abrasive grains.

15. The method of making a rubber bonded abrasive article comprising the steps of mixing a mass of crude rubber with sufficient sulfur to vulcanize the same to a hard rubber while repeatedly passing it between revolving rolls until the compound has a doughy consistency, thereafter adding abrasive grains to the mass and kneading and plasticizing it so as to cause the rubber to be shredded in the presence of the abrasive grains and softened sufficiently to embed the grains in said shreds, forming an article from the rubber and abrasive mass and vulcanizing the same and thus integrally bonding the abrasive grains.

DUANE E. WEBSTER.